E. B. CAMPBELL.

REDUCING MILL.

APPLICATION FILED DEC. 29, 1919.

Reissued June 22, 1920. 14,886.

INVENTOR.
Edward B. Campbell.
BY J. M. Carmack.
ATTORNEY.

UNITED STATES PATENT OFFICE.

EDWARD B. CAMPBELL, OF ST. LOUIS, MISSOURI, ASSIGNOR TO WILLIAMS PATENT CRUSHER AND PULVERIZER CO., OF ST. LOUIS, MISSOURI, A CORPORATION OF MISSOURI.

REDUCING-MILL.

14,886. Specification of Reissued Letters Patent. Reissued June 22, 1920.

Original No. 1,315,281, dated September 9, 1919, Serial No. 276,166, filed February 10, 1919. Application for reissue filed December 29, 1919. Serial No. 348,184.

*To all whom it may concern:*

Be it known that I, EDWARD B. CAMPBELL, a citizen of the United States, residing at St. Louis, State of Missouri, have invented certain new and useful Improvements in Reducing-Mills, of which the following is a specification.

This invention relates to certain new and useful improvements in reducing mills having especial reference to rotary hammers for mills used for grinders, feed cutters and like reducing mills, the peculiarities of which will be hereinafter described and claimed.

The main object of my improvements is the provision of a flat bar rotary hammer forming a long, thin operative edge at front and rear operating in the cylindrical curved plane of rotation of the head, which head is formed at right angles to the leg by which it is pivoted so that said hammer may be mounted in multiple in a rotor and thus secure a more flexible action on the material fed to said mill than the so-called "stirrup hammer" that has a long operative edge extending between two legs by which it is pivoted.

In the accompanying drawing in which like reference letters indicate corresponding parts, Figure 1 represents a vertical sectional view of the housing of a mill and rotor embodying my improvements, the section being taken across the shaft;

The letter A designates the housing and B the hopper of a suitable mill in which is mounted the shaft C, carrying pairs of disks D keyed to said shaft and in which are mounted hammer rods E, on which are pivoted hammers of the construction and shape now to be described. A suitable cage F and breaker plate G is provided for coöperation with said hammers.

Figure 4:
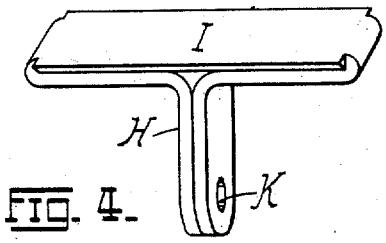
Fig. 4 is a similar view of a hammer with a sharpened edge.
Figure 5:
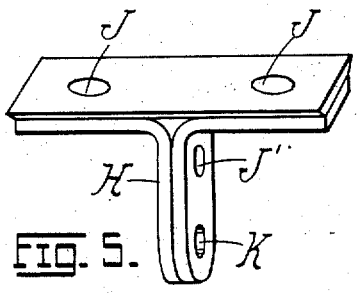
Fig. 5 is a similar view of a hammer of three pieces riveted together through line 28.
Figure 6:
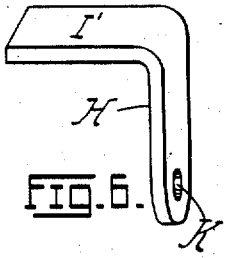
Fig. 6 is a similar view of a half length head hammer to fill out a row of T-head hammers.
Figure 3:
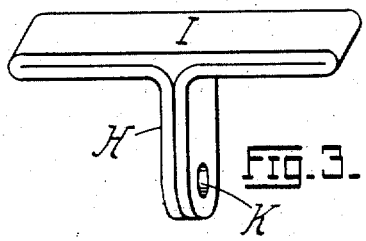
Fig. 3 is a detailed perspective view of a hammer shown in Fig. 2.
Figure 2:
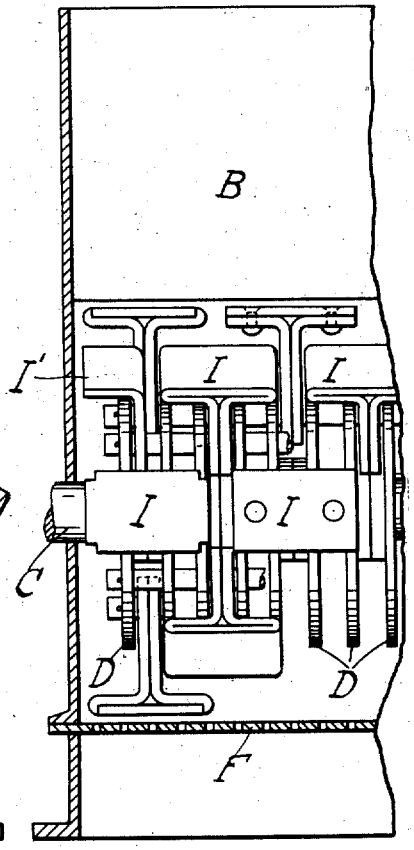
Fig. 2 is a partial sectional view of the housing taken in a vertical axial plane, and face view of part of the rotor with hammers of my style mounted thereon and showing a half length head to fill out alternate rows.

The disks D are mounted in pairs or series along the shaft C, and between each pair of disks the flat bar legs H of my hammers are mounted as shown in Fig. 2. The flat bar of which the hammer is composed, is of relatively greater width than thickness, and the head I is likewise formed of a flat bar and mounted on said leg so that the head extends laterally at right angles to the flat side of said leg substantially a distance equal to the length of the leg, thereby presenting the lesser dimensions of the bar in both the leg and the head to form the operative edge of head and leg. The flat bar used preferably to form the leg is doubled in its lesser dimension or thickness, and the head is likewise doubled and may be riveted together or otherwise fastened so as to constitute one piece and form a T-head. As shown in Fig. 3, this form of hammer is made from one piece of flat bar that is bent and doubled in layers to form a T-head hammer. In Fig. 4 the upper layer of the head is beveled or sharpened at its front and rear edge on its outer side, to form a cutting edge and allow of its being reversed and either edge used as the forward cutting edge for the time being. In Fig. 3 the operative edge is plain and square.

Figure 1:
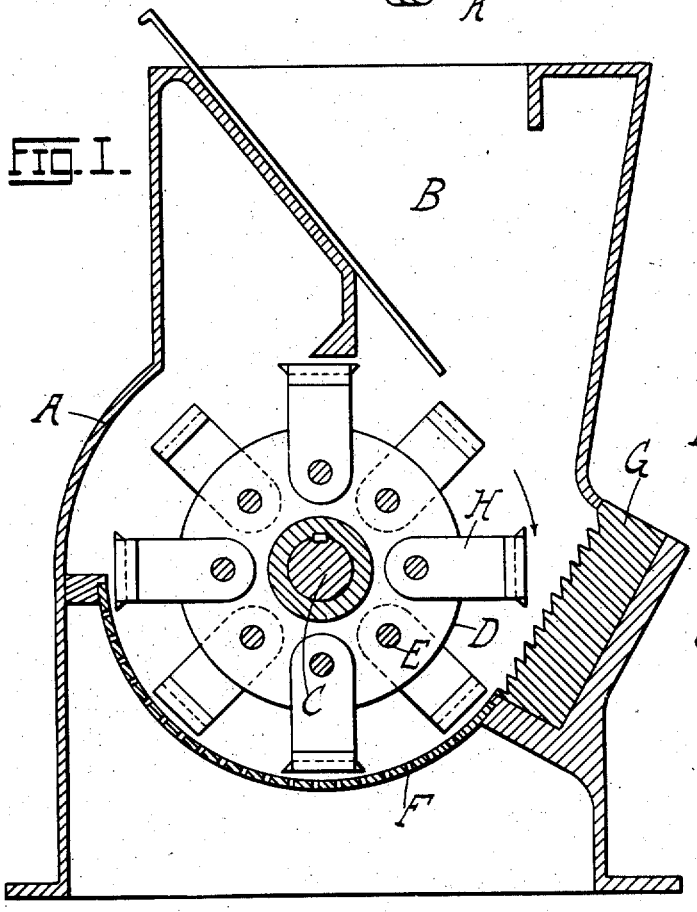

Referring to Fig. 2 it will be seen that the T heads of the hammers form rows parallel to the shaft, on account of their being mounted alternately on the rods E as shown in Fig. 1. That is to say, the heads of the respective hammers in one row overlap the path of the following hammers in another row, while they form a long cutting edge that is broken up into individual units and give flexibility in their operation on the material. Thus if a piece of material is struck by one hammer, this hammer will be pressed backward without influencing the cutting action or slicing action of the other hammers in the same row which are not acting on this chunk of material, such as bulbs, beets, turnips, etc. In another well known form of grinder, the hammers are independent straight bars pivoted between a series of disks, so that the shanks of the hammers occupy practically all the space between the cutting ends and the peripheries of the disks, thus increasing the weight of the rotor, increasing the opposition of wind and material and requiring greater power to operate than in the present form. In another form of hammer the operative edge is formed by a cross bar practically the width of the casing and the long bar head has no flexibility of action, as in my style.

In the form shown in this application, the flexibility of the operating edge is maintained, the space between said edge and the disks is left open, the reduced number of shanks required by the present form of T-head as compared with the independent hammers mentioned, cheapens the construction, increases the slicing action, reduces the opposition of wind and material and hence the driving power required.

While I have shown the single T-head and the intermediately located leg for said head as formed of a double flat bar, the hammer may be otherwise formed as long as the T-head principle and the slicing action as distinguished from the beating and crushing action is maintained as above described.

In all these forms of T-hammers, the lesser dimension of both the head and the leg is presented to the material being operated on, and the slicing effect upon the material is similar to that of a stirrup hammer with the flat connecting cross bar and legs at the ends of the cross bar head.

This form of head secures cheapness in construction and the small surface of the cross bar used as the operative edge increases the efficiency of the slicing action in passing through the material, making less wind opposition and causing less expenditure of power.

What I claim is:

1. In a machine of the character described; a pivotal slicing hammer, consisting of a flat bar, bent so as to form a double flat top and double shank portions, said top extending laterally beyond said shank and having its upper portion beveled and extending in front of its lower portion on both front and rear forming cutting edges thereon, said shank having an opening therein.

2. In a machine of the character described; a pivotal slicing hammer consisting of a flat bar, bent so as to form a double flat top and double shank portions, said top extending laterally beyond said shank, said shank having an opening therein,—the width of said bar being relatively much greater than the thickness so that the lesser dimension of the bar in leg and head is presented to the material being operated on, and slices through the material, substantially as described.

3. In a machine of the character described, a pivotal T-shaped slicing hammer consisting of a double shank portion having an opening at its inner end and whose outer ends are bent laterally so as to extend substantially parallel to the axis of revolution, said outer ends having a cutting edge extending parallel with the central line of said shank opening.

4. In a machine of the character described, a pivotal T-shaped slicing hammer consisting of a flat bar bent to form a double flat top and double shank portions, said shank portions having registering openings through their inner ends and said top having a cutting edge extending parallel with the central line of said shank openings.

5. In a machine of the character described, a T-shaped slicing hammer comprising a single piece of metal bent to form a double thickness shank portion and a double thickness head portion, the latter extending on each side of the shank portion at substantially right angles thereto and in a plane parallel to the axis of revolution, said double thickness shank portion having an opening through its inner end and said portion having a cutting edge extending parallel with the central line of said shank opening.

6. A T-hammer composed of a flat bar bent so as to form a double shank portion having an opening at its free end and a double head portion.

7. A T-hammer composed of a flat bar bent so as to form a double shank portion and oppositely disposed double head portions.

8. In a machine of the character described, a pivotal T-shaped slicing hammer consisting of a double shank portion having an opening at its inner end and whose outer ends are bent laterally so as to extend substantially parallel to the axis of revolution forming a double head portion, said outer ends being provided with oppositely disposed cutting edges.

In testimony whereof I hereunto affix my signature, this 12th day of December, 1919.

EDWARD B. CAMPBELL.